UNITED STATES PATENT OFFICE.

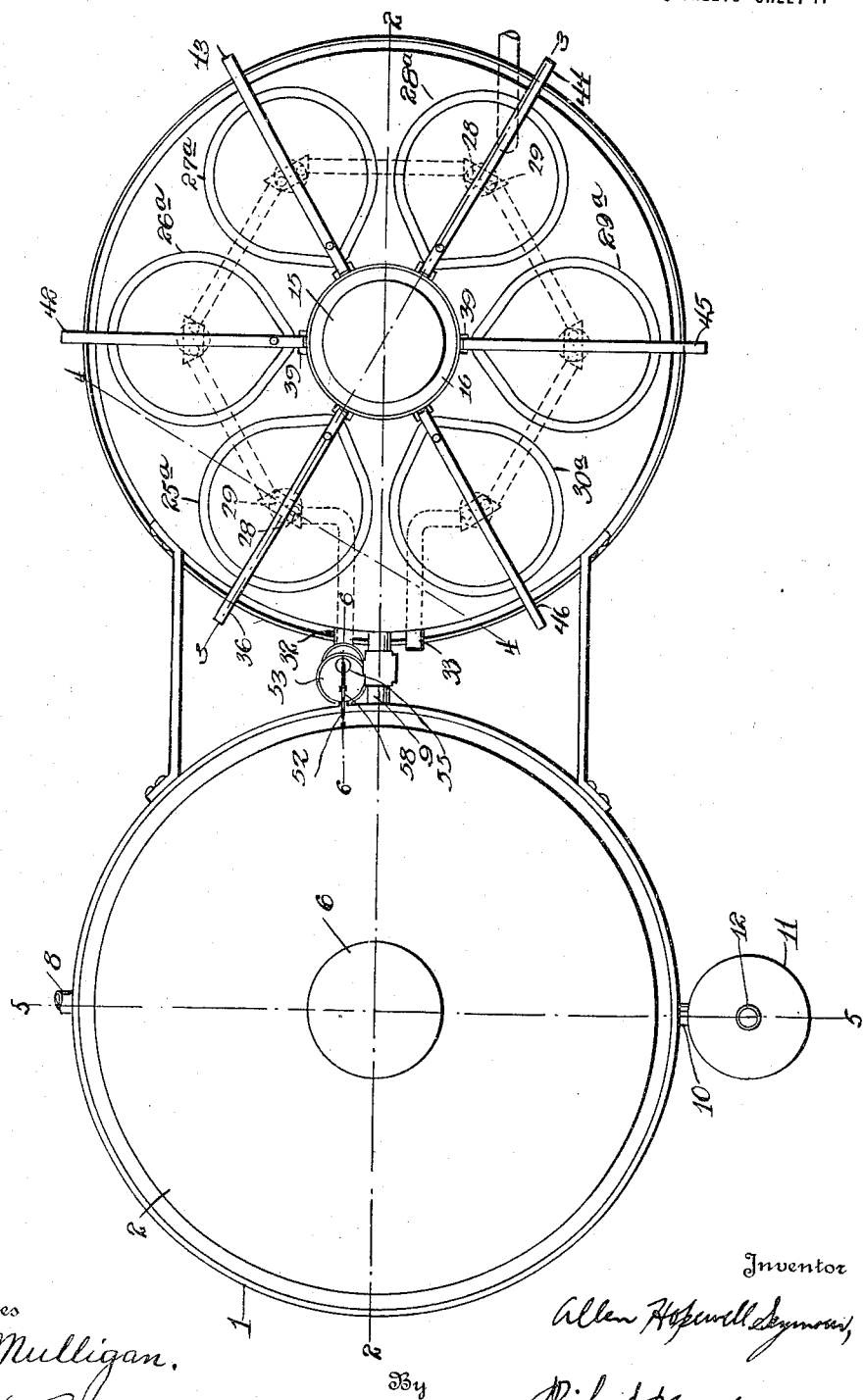

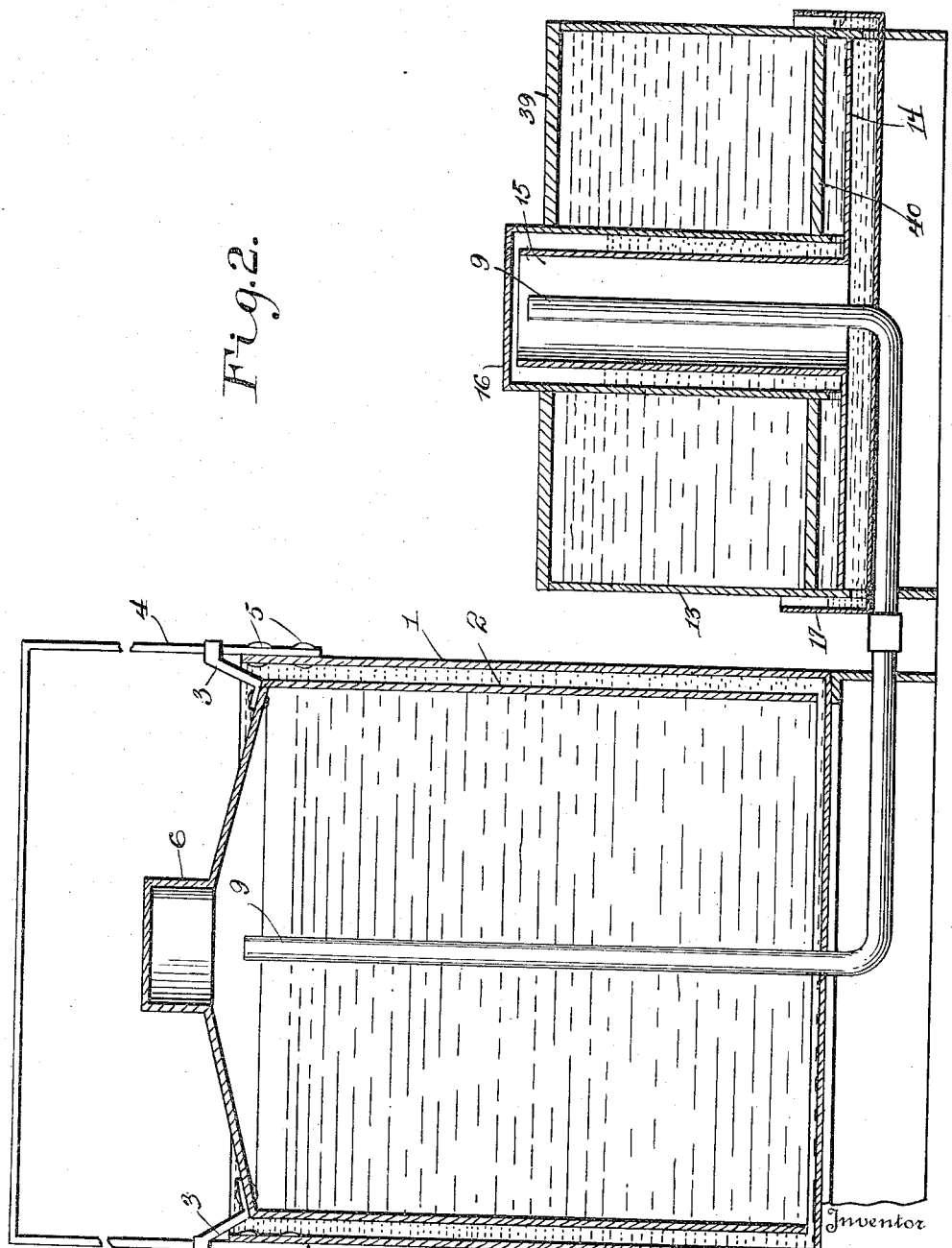

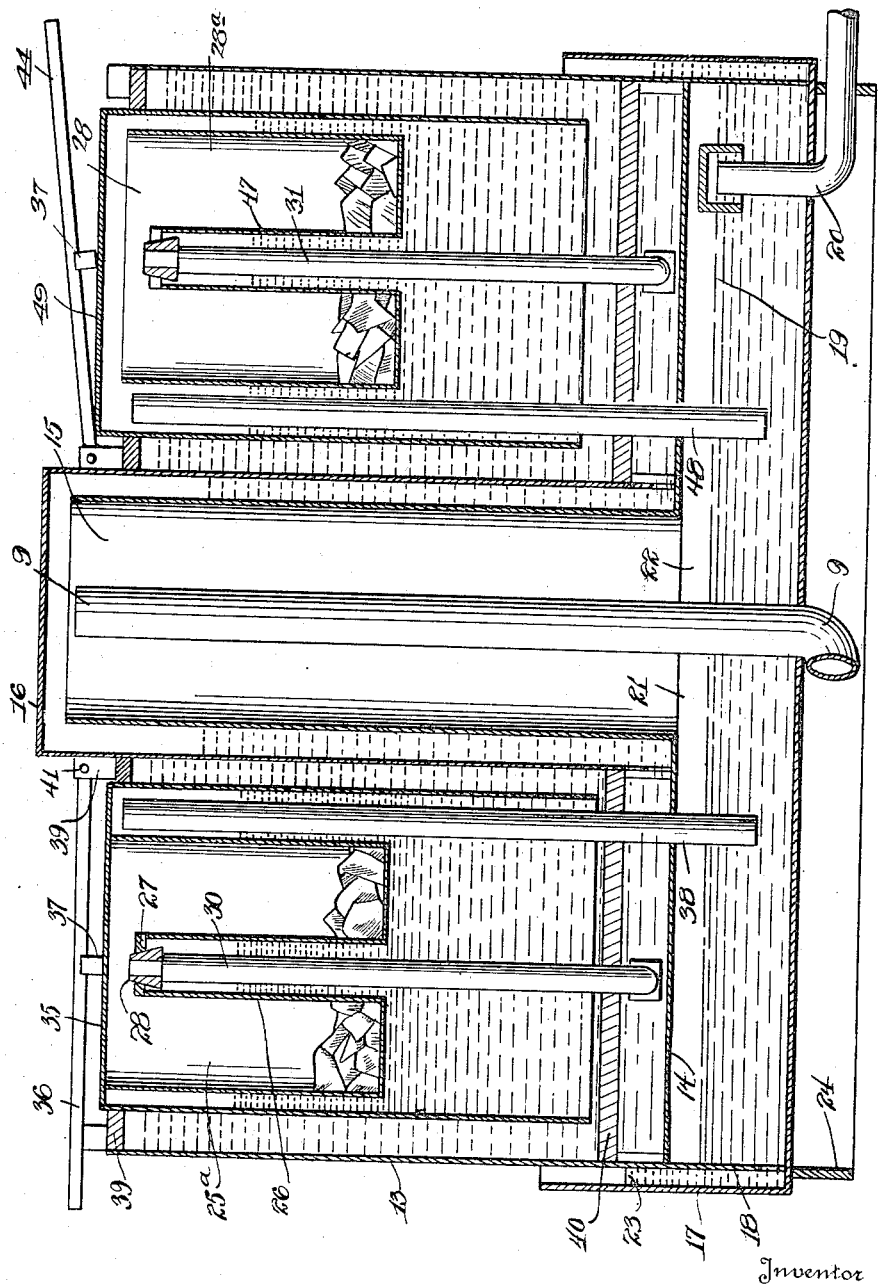

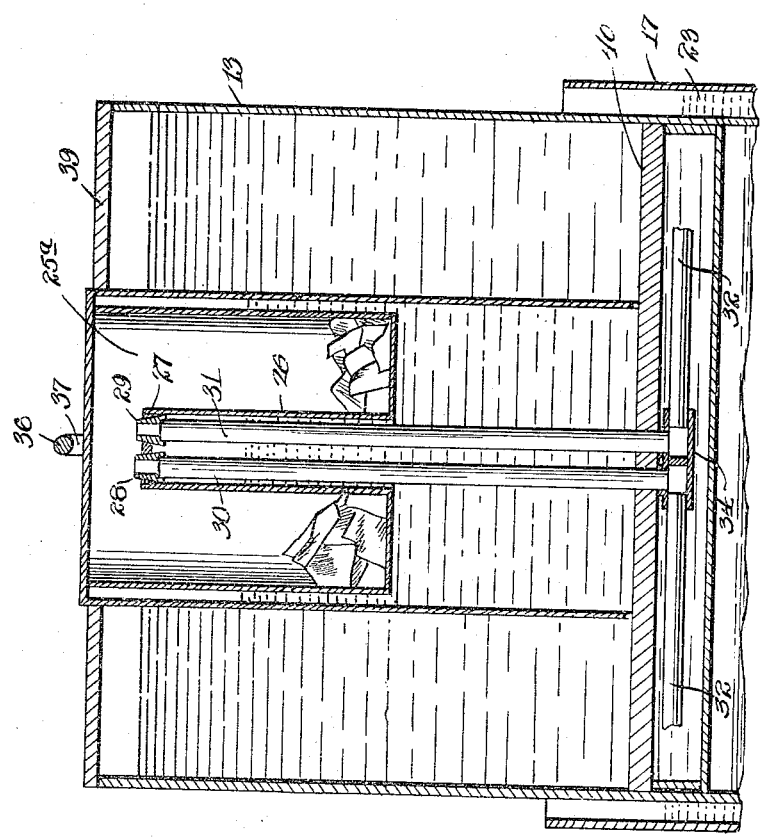

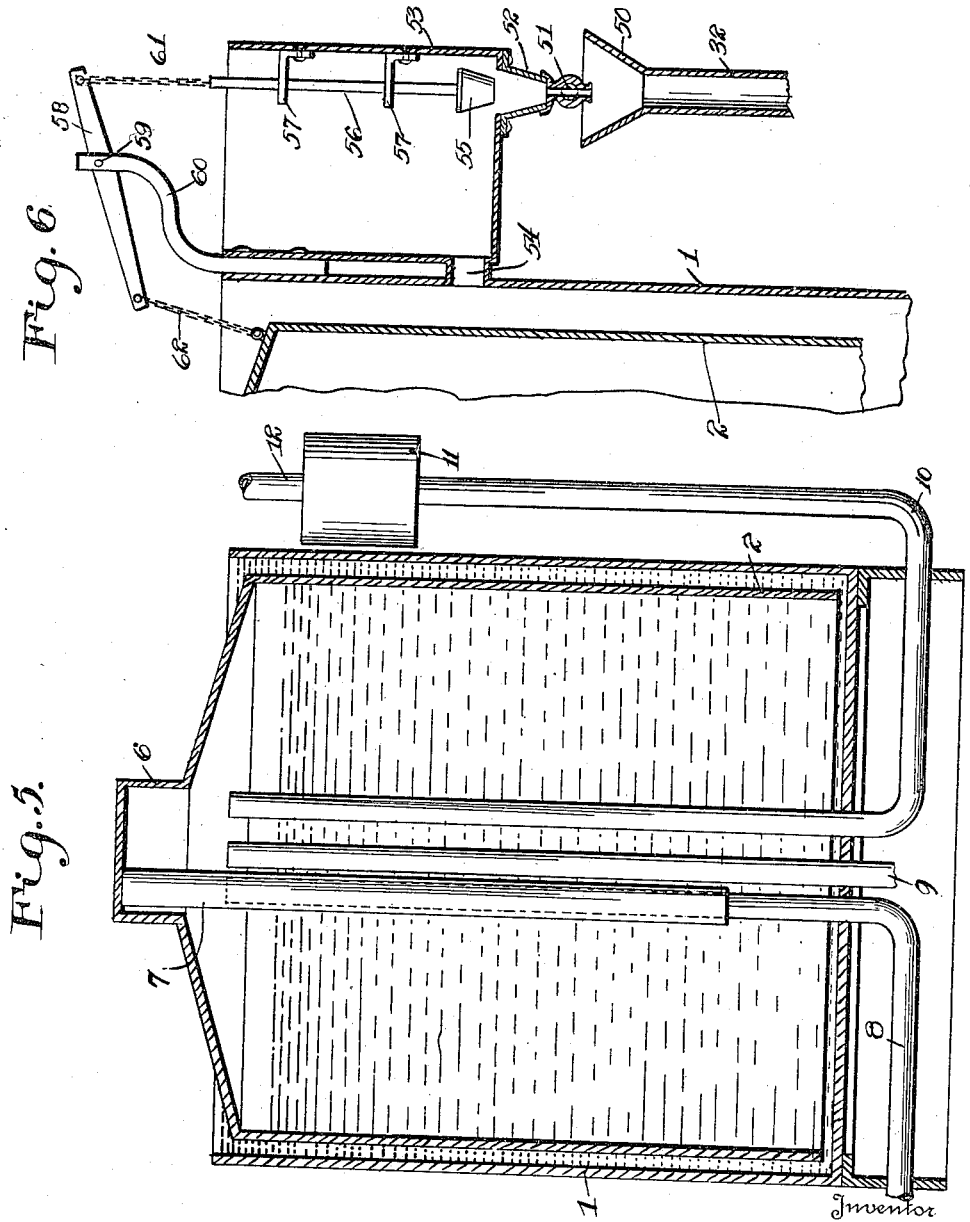

ALLEN H. SEYMOUR, OF BAINBRIDGE, OHIO.

ACETYLENE-GAS APPARATUS.

1,205,275.    Specification of Letters Patent.    Patented Nov. 21, 1916.

Application filed December 11, 1913. Serial No. 806,041.

*To all whom it may concern:*

Be it known that I, ALLEN HOPEWELL SEYMOUR, a citizen of the United States, residing at Bainbridge, in the county of Ross and State of Ohio, have invented certain new and useful Improvements in Acetylene-Gas Apparatus, of which the following is a specification.

This invention relates to improvements in acetylene gas apparatus and has to do with that type which is known as the water feed, in contradistinction to carbid feed. Both the water feed and carbid feed generators, for machines of this character, are open to the drawback of after generation and in cases where a plurality of generators are utilized, for one gasometer, the reserve charge of one generator is open to subjection to the gases and steam from another generator thereby adding to the disadvantage of after and over-generation.

It is one of the objects of my invention to provide a generator for supplying gas to a gasometer, the arrangement being such that a relatively small quantity of carbid may be charged in each separate generator so that the generator as a whole, will provide for a relatively great gas-producing capacity.

A further and very important object is to completely and wholly insulate each separate generator, the one from the other, so that absolutely no generation can be effected in one, during generation in another.

A further object is to provide for a consecutive generation or action of the several generators so that when the charge of one has been exhausted, and the bell of the gasometer descends, generation will be automatically initiated in the next successive generators.

Other objects and features of my invention will be more fully described in connection with the accompanying drawings and will be more particularly pointed out and ascertained in and by the appended claims.

In the drawings, Figure 1 is a plan view of one form of my acetylene gas machine. Fig. 2 is a sectional view on line 2—2 of Fig. 1. Fig. 3 is a sectional view on line 3—3 of Fig. 1. Fig. 4 is a sectional view on line 4—4 of Fig. 1. Fig. 5 is a sectional view on line 5—5 of Fig. 1. Fig. 6 is a sectional view on line 6—6 of Fig. 1.

In the particular form shown, a gasometer is illustrated comprising a tank 1 in which a bell 2 is disposed. The bell 2 may be guided by means of arms 3 adapted to coact with a guide 4, suitably secured to the tank 1, as indicated at 5. The bell 2 is provided with a dome 6 to which a sleeve 7 may be secured. The sleeve 7 constitutes a part of a safety blow-off device, the other part of which consists of a pipe 8 extending up into the sleeve 7 so that upon rising movement of the bell 2, to a predetermined height, gas would be discharged through the blow-off device when consumption was shut off through the regular supply pipe leading therefrom.

A supply pipe 9 leads from a generator, which will be hereinafter referred to, and discharges into the upper end of the bell 2, as shown. A consumption pipe 10, leads from the bell to a filter 11, of any suitable construction, from which a pipe 12 leads to the point of supply or consumption of the gas.

Next, referring to the generator, 13 designates a main tank having a bottom 14 and provided with a centrally disposed upwardly extending hollow shaft 15 forming a gas-receiving chamber which communicates with all of the generators through a water seal. The gas-receiving chamber 15 is closed by a bell 16 which may be anchored against upward movement in any desirable manner and which projects downwardly into the water contained in the tank 13 so as to seal the chamber 15 against egress of gas except through the supply pipe 9. As will be seen by reference to Fig. 3, the supply pipe 9 opens to the gas-receiving chamber near the upper portion thereof.

The main tank 13 is shown supported in a sealing tank 17, in a manner to dispose the bottom 14 of the main tank at some distance above the bottom of the sealing tank, and as shown, I have provided the main tank 13 with extensions 18 for supporting the main tank. A water level 19 is maintained in the sealing tank at an elevation controllable by an outlet 20, and such level is preferably restricted so that it will not close the lower opening of the receiving chamber 15, which opening is indicated at 21. The space indicated at 22, forms a gas space from which the gas ascends into the chamber 15 from delivery means leading from the several generators, in a manner which will hereinafter more fully appear. The chamber formed by the sealing tank and the bottom of the main tank, is itself sealed by a liquid level 23, between the main tank and the sealing tank, which level is maintained by gas pressure against level 19. A suitable support 24 may be provided for the sealing tank 17.

A plurality of carbid holders generally indicated at 25ª to 30ª, are disposed in the main tank 13, and as all are of similar construction only one need be described in detail. Inasmuch as the tank is shown circular, the carbid holders are disposed circumferentially about the receiving chamber 15.

Referring to holder 25ª, the same consists of a receptacle having an upstanding tube 26 therein which extends toward but not to the top of the holder or receptacle. The holder 25ª will be immersed in the liquid in the tank 13, as shown in Fig. 3, so that the upstanding tube 26 will increase the area of the holder which is subjected to the water thereby maintaining a comparatively low temperature in the holder notwithstanding the heat generated by the action of water on the carbid in generating gas. The top of the tube 26 is closed by a supporting cap 27 provided with openings therein through which nozzles 28 and 29 project. The nozzles 28 and 29 are tapered so that they will fit tightly in the cap-support 27 and thereby support the carbid holder in the position shown. Nozzle 28 is mounted upon a water inlet pipe 30 and nozzle 29 is mounted upon a water overflow pipe 31. Each carbid holder is provided with a water inlet and an overflow pipe connected in the manner shown in Fig. 4. The inlet or supply to the pipe 31 is indicated at 32 and the final outlet at 33. The path of the pipe 32 is clearly indicated in Fig. 1 and adjacent each holder, a pipe coupling 34 will be provided for connection of pipes 30 and 31 so as to force the water from 32 up through 30 and into the holder and then out through pipe 31 from the holder to the next generator. The pipe coupling 34 has two outlets at one side thereof to permit connection of the pipes 30 and 31, and a partition is disposed across the interior of the coupling to preclude communication between the two side openings thereof. At the start or first installation, pipe 32 will be primed, past the couplings 34, so as to prevent any of the gases generated in the first holder to be operated, from passing through the overflow 31 of such holder into the reserved charge of the next holder.

Each holder is provided with a valve cover 35 which extends downwardly into the tank over the holder and which is limited from upward movement by reason of gas pressure in the holder, by a lift bar 36. The lift bars, or closing levers, which have for the several holders been designated 36, 42, 43, 44, 45, and 46 are pivotally mounted and are made to have sufficient weight that they will normally hold the covers 35 closed to rest against the upper rim edges of the various holders and to thus establish the desired closure of the holders. A suitable abutment 37 may serve to prevent upward movement of the bell cover 35 beyond a predetermined extent. However, in the present form, the bell cover 35 will be raised by pressure of gas in the holder 25 sufficiently to permit of passage of the gas out of the holder 25. Each holder is provided with a gas discharge pipe, the discharge pipe of holder 25ª being indicated at 38, and the same extends upwardly in the bell cover 35 to a point near the top of the holder 25ª. Said discharge pipe 38 extends downwardly through the bottom 14 of the main tank to a point below the sealing level 19 of the sealing tank 17. Thus the gas discharge from pipe 38 will bubble up through the sealing water and will flow into the gas space 22 and rise in the receiving chamber 15. From the receiving chamber 15 the gas will find an outlet through the supply pipe 9 leading to the gasometer. In order to provide supports for the piping and guiding devices for the bell covers, I provide upper and lower partitions 39 and 40 which serve to take the place of frame work. The closing levers 36, 42, 43, 44, 45 and 46 may be secured to the upper partition 39, in any desirable manner, and they may be hinged at 41, as shown. In Fig. 1, the closing or retaining levers are indicated at 36, 42, 43, 44, 45 and 46. At the right of Fig. 3, the holder 28ª is provided with an upright spout 47 and a discharge pipe 48 leading from the bell cover 49 to a point below the liquid level 19 in the sealing chamber.

I provide means controlled by the bell of the gasometer for governing the supply of water to pipe 32, and as shown in Fig. 6, the pipe 32 terminates in a funnel 50 into which a pet-cock 51 discharges. The pet-cock 51 is attached to a valve seat outlet 52 leading from an auxiliary tank 53. Said auxiliary tank 53 is connected at 54 so as to be supplied from water in the tank 1 of the gasometer. A valve 55, provided with a stem 56, slidable in guides 57, is connected with an operating lever 58. The operating lever 58 is pivotally mounted at 59 on a support 60 and one end of the lever is connected by a chain 61 to the valve stem 56 of the other end by chain 62, to the bell 2. Thus when the bell 2 of the gasometer rises under a supply of gas through supply pipe 9, the valve 55 will be moved toward a closing position, and when consumption or lack of supply of gas causes the bell 2 to descend, the valve 55 will rise, as shown in Fig. 6. The pet-cock 51 is to govern the flow from the auxiliary tank 53 to the pipe 32.

In view of the foregoing description, and by reference to Fig. 1, it will be seen that the carbid holders 25ª to 30ª, or generators as they may be called, are serially connected so that water supply to the first holder or generator 25 will completely exhaust the charge thereof without in any way affecting the charges of carbid in the other generators. It will be further clear that water will be continuously supplied to the first generator until the charge has become exhausted and when the level in the first generator reaches the nozzle 29 of its overflow pipe 31, the water supply to the first generator or holder 25ª will pass through overflow pipe 31 to pipe 32 and therefrom into generator 26ª, or the holder thereof. By having the pipe 32 initially filled so that the steam and gases generated in the first holder could not directly pass through pipe 31 into the next holder, it will be seen that each holder is isolated from its companion holder so that only a serial operation of the generators would be possible. When the carbid of all of the chambers has been exhausted, then it will be necessary to clean out the same and the bell covers thereof can be readily removed, and likewise the holders themselves, for this purpose. However, should the charges of the several generators become exhausted at night time, any one could be recharged without in any way affecting the others.

From the foregoing it will be seen that I have provided an apparatus in which the holders are not only surrounded by water which will absorb the heat used in generation, but also the charge in each of the holders is protected from the action of water vapor and gas, which protection is afforded by the device of my invention, both as regards each individual generator, and as regards the working generator with respect to the generator which has not been started. It is one of the special features of my invention that whereas I provide a plurality of generators which can all be charged at once and operated serially, I totally isolate each generator from its companion generators by a water seal so that there can be no surplus generation over and above the generation in the working chamber. Furthermore, there can be no after generation by reason of the fact that the charge in one chamber is exhausted, where such chamber is the working chamber, prior to starting a new generator.

It is believed that the device of my invention will be clear from the foregoing disclosure and while I have herein shown and described one specific form of my invention, I do not wish to be limited thereto except for such limitations as the claims may import.

I claim:

1. An acetylene generator comprising in combination, a main tank provided with a gas receiving chamber, a plurality of carbid holders mounted in said tank to be partly immersed, said holders having the side walls thereof made imperforate having the tops open, a bell cover for each holder, means to normally hold said bell covers in a relation to close the open tops of said carbid holders against the ingress of air and moisture or vapor rising from the water in which the holders are partly immersed, a gas discharge pipe for each of said carbid holders arranged to extend adjacent the sides thereof to a point above the liquid level in the main tank and to be within the bell covers of the holders, said parts being so arranged that access to the holders is closed by the bell covers and communication from the holders to the gas receiving chamber is also closed by such covers, and water supply means arranged to supply water successively to said carbid holders to cause generation of gas therein and in consequence to raise the bell covers to permit the gas to be conducted to the gas receiving chamber through the gas discharge pipe.

2. An acetylene generator comprising in combination, a main water seal tank provided with a gas receiving chamber, a plurality of carbid holders mounted in said tank around the gas receiving chamber to be partly immersed in the water contained in the tank, said holders having the side walls thereof made imperforate and terminating in rim-like edges at their upper ends, a bell cover for each holder made to have the sides of sufficient length to extend down into the water of the tank and having the top thereof imperforate so that as gas is generated in said holders, the bell covers will be caused to rise, gas discharge pipes for each of said holders arranged with the intake ends thereof above the level of the water in the tank and within the bell cover of each holder, gravity means for normally holding said bell covers in a relation to fit against the open rim top edges of the carbid holders to close the open ends thereof against the ingress of air and moisture and to also close communication to the gas discharge pipes, water supply means arranged to supply water successively to said carbid holders to cause generation of gas therein and in consequence to raise the bell covers to permit the gas to be conducted to the gas receiving chamber, a main gas receiving bell to which the gas is conducted from said gas receiving chamber, and water supply control means adjusted by movement of the gas bell to regulate and control the flow of water through said supply means.

3. An acetylene generator comprising in combination, a main water seal tank provided with a gas receiving chamber, a plurality of carbid holders mounted in said tank around the gas receiving chamber to be partly immersed in the water contained in the tank, said holders having the side walls thereof made imperforate and terminating in rim-like edges at their upper ends, a bell cover for each holder made to have the sides of sufficient length to extend down into the water of the tank and having the top thereof imperforate so that as gas is generated in said holders, the bell covers will be caused to rise, gas discharge pipes for each of said holders arranged with the intake ends thereof above the level of the water in the tank and within the bell cover of each holder, gravity means for normally holding said bell covers in a relation to fit against the open rim top edges of the carbid holders to close the open ends thereof against the ingress of air and moisture and to also close communication to the gas discharge pipes, a main water supply pipe arranged to lie adjacent each of the carbid holders, pipe couplings connected in said water pipe adjacent each of the holders provided with a pair of outlet openings and having a partition wall disposed between said openings, an intake water pipe connected with said couplings at one of the openings to have the inner end thereof disposed in the adjacent carbid holders, a water overflow pipe connected in the remaining opening of each of the couplings and extended to have its free end at the same level as the water supply pipe, and means controlled in accordance with the volume of gas passing from said gas receiving chamber to regulate the supply of water through said water supply pipe.

In testimony whereof I affix my signature in presence of two witnesses.

ALLEN H. SEYMOUR.

Witnesses:
E. L. CASE,
FRED C. STULTZ,

Copies of this patent may be obtained for five cents each, by addressing the "Commissioner of Patents, Washington, D. C."